(12) United States Patent
Amathieu et al.

(10) Patent No.: US 7,208,040 B2
(45) Date of Patent: Apr. 24, 2007

(54) ETTRINGITE BINDER FOR DENSE MORTAR, COMPRISING CALCIUM SULPHATES AND A MINERAL COMPOUND OF CALCIUM ALUMINATES

(75) Inventors: Loris Amathieu, Saint Laurent de Mure (FR); Bruno Touzo, Lyons (FR)

(73) Assignee: Lafarge Aluminates, Paris (FR)

( * ) Notice: Subject to any disclaimer, the term of this patent is extended or adjusted under 35 U.S.C. 154(b) by 0 days.

(21) Appl. No.: 10/512,347

(22) PCT Filed: Apr. 24, 2003

(86) PCT No.: PCT/FR03/01304

§ 371 (c)(1),
(2), (4) Date: Nov. 1, 2005

(87) PCT Pub. No.: WO03/091179

PCT Pub. Date: Nov. 6, 2003

(65) Prior Publication Data

US 2006/0118006 A1   Jun. 8, 2006

(30) Foreign Application Priority Data

Apr. 24, 2002   (FR) .................................. 02 05174

(51) Int. Cl.
*C04B 7/32* (2006.01)
(52) U.S. Cl. ...................... 106/695; 106/692
(58) Field of Classification Search ................ 106/695, 106/692
See application file for complete search history.

(56) References Cited

U.S. PATENT DOCUMENTS

| 3,147,129 | A |   | 9/1964  | Armstrong et al. |         |
|-----------|---|---|---------|------------------|---------|
| 4,350,533 | A |   | 9/1982  | Galer et al.     |         |
| 4,404,031 | A | * | 9/1983  | Sudoh et al.     | 106/715 |
| 4,481,037 | A | * | 11/1984 | Beale et al.     | 106/694 |
| 4,957,556 | A |   | 9/1990  | Kunbargi         |         |
| 6,780,237 | B2| * | 8/2004  | Mills et al.     | 106/724 |
| 6,923,857 | B2| * | 8/2005  | Constantinou et al. | 106/695 |

FOREIGN PATENT DOCUMENTS

| DE | 32 18 446   |    | 11/1983 |
|----|-------------|----|---------|
| DE | 2861388 A1  | *  | 4/2006  |
| FR | 840 626     |    | 4/1939  |
| FR | 2 529 192   |    | 12/1983 |

OTHER PUBLICATIONS

Chemical Abstracts, vol. 80, No. 16, Apr. 22, 1974 Columbus, Ohio US; abstract No. 86896h, p. 251, XP002234031 abstract & JP 48 084830 A (K. Hirano, et al.) Nov. 10, 1973.

* cited by examiner

*Primary Examiner*—Anthony J. Green
(74) *Attorney, Agent, or Firm*—Young & Thompson

(57) ABSTRACT

The invention relates to an ettringite binder for dense mortar, comprising calcium sulphates and a calcium aluminate mineral compound, the calcium aluminate mineral compound comprising calcium C and aluminum A oxides, soluble and combined in one or more crystallized and/or amorphous mineralogical phases, in such proportions that:
  the useful C/A molar ratio of the calcium aluminate mineral compound ranges from 1.2 to 2.7;
  the sum in weight of the useful (C+A) phases accounts for at least 30% of the total weight of the mineral compound.

18 Claims, 1 Drawing Sheet

ETTRINGITE BINDER FOR DENSE MORTAR, COMPRISING CALCIUM SULPHATES AND A MINERAL COMPOUND OF CALCIUM ALUMINATES

BACKGROUND OF THE INVENTION

1. Field of the Invention

The present invention relates to an ettringite binder for a mortar, including for a dense mortar, preferably with a water/solid weight ratio lower than 0.5, said binder comprising a calcium aluminate and calcium sulphate mineral compound.

It is meant under ettringite binder a hydraulic binder with the components thereof giving, upon hydration under normal use conditions, as the main hydrate ettringite, which is a calcium trisulphoaluminate having as a formula $3CaO, Al_2O_3 \cdot 3CaSO_4 \cdot 32H_2O$.

It is meant under solids all the dry components of the mortar.

The invention also relates to a dry mortar formulated from such an ettringite binder comprising the calcium aluminate and calcium sulphate mineral compound.

The invention further relates to a wet mortar obtained from mixing dry mortar such as defined hereinabove, with water in such an amount that the water/solid weight ratio is lower than 0.5.

Finally, the invention relates to the use of a calcium aluminate mineral compound for formulating an ettringite binder, a dry mortar or a wet mortar such as defined hereinabove.

The ettringite binder comprising a calcium aluminate and calcium sulphate mineral compound is adapted to be used in mortars and concrete in a building where a quick reoperation of the structure is expected. More particularly, it makes it possible to make floor repair and preparation products such as, for example, screeds, smoothing coatings, paving glues.

A quick reoperation for structures requires reaching, depending on the applications, a minimum mechanical strength level at a given time and/or a coating time defined by the residual moisture in the material. The products adapted for a quick reoperation are conventionally prepared from a binder with the hydration thereof leading to forming ettringite.

2. Description of the Related Art

In the smoothing coating application for example, according to the specifications of the Centre Scientifique et Technique du Bâtiment "Produits et systèmes de préparation de sols intérieurs pour la pose de revêtements de sols minces"—Guide technique pour l'avis technique et le classement P. Cahiers du CSTB, n°2893 —Delivery n°370, Jun. 1996), products should meet at the same time mechanical performance criteria, adhesion performance criteria as well as use usability criteria [paste homogeneity, fluidity (spreading diameter of the paste being previously poured into a ring with 30 mm height and 50 mm diameter) and gelling time].

In addition to the criteria as required by the CSTB, the quick smoothing coatings should at least meet the following criteria under normal temperature and hygrometry conditions:

spreading of 150 mm at 7 and 20 minutes;

mechanical compression strengths higher than 4 MPa at 4 hours;

24 h coating time (3% residual moisture in the material for coating thicknesses lower than 10 mm); and mechanical compression strengths higher than 25 MPa at 28 hours.

The ettringite-forming chemical reaction is as follows:

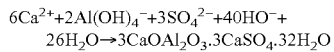

The ettringite solubility product at equilibrium is: $K_{ett} 32\ 4.9 \times 10^{-44}$. The formation rate of ettringite (nucleation degree and ettringite crystal growth) depends on several parameters, including the oversaturation coefficient $\beta$, linked to the energy available for forming nuclei:

$$\beta = (a_{Ca2+})^{6} * (a_{Al(OH)4-})^{2} * (a_{SO42-})^{3} * (a_{OH-})^{4} / K_{ett}$$

wherein $a_i$ stands for the activities of ions i.

Ettringite can be obtained from the hydration of compositions comprising calcium aluminates and a source of sulphate, and optionally Portland cement and/or lime bringing in solution the ions required to perform such a chemical reaction. Calcium aluminates are combinations of aluminium oxide $Al_2O_3$ represented by A in the cement nomenclature, and of calcium oxide CaO represented by C in the above mentioned cement nomenclature, such oxides being crystallized more particularly under the C3A, C12A7 and CA forms.

In practice, formulations for mortars with quick hardening and drying nowadays comprise an association of calcium aluminates, calcium sulphate and Portland cement, with the proportions of each of the components being tricky to define, as the hydration under the ettringite form should be controlled so as to reach the best compromise between the ettringite amount being that ensures the drying ability of the product (high amount of mixing water being crystallized under the form of hydrates) and the morphology of such an ettringite, which, for a given crystal density, ensures the mechanical strength level and the control of the dimensional variations throughout the entire hardening process up to the long term. Such a compromise is all the more harder to reach as the fastness levels of strength acquiring to be obtained should be compatible with the expected implementing characteristics, in particular the workability hold time.

Such a compromise is not obtained satisfactorily in mortars of the prior art.

Thus, for example, U.S. Pat. No. 4,350,533 discloses ettringite cement compositions based on calcium aluminate, calcium sulphate cements, more particularly under the form of gypsum, and optionally separately supplied lime and Portland cement. But the development kinetics for mechanical strengths is much lower than the one desired within the scope of the present invention.

It is known, for so-called "Mine Packing" applications (where it is aimed at filling the recesses occurring in underground structures), to use ettringite mixtures of calcium aluminates and calcium sulphate. But the requirements of the system differ considerably from the "dense mortar" applications of the invention: the product should be pumpable, set quickly, but with a water/solid ratio in the order of 5 (the important point in such an application being to create much volume), the mechanical compression strengths at 24 hours do not exceed 5 MPa. Further, the system durability is not a key criterium, neither are the dimensional variations. The existing requirements in "dense mortar" applications are such that it is not possible to use such "mine packing" solutions directly, they are to be reformulated and adapted to the dense system requirements.

BRIEF SUMMARY OF THE INVENTION.

An aim of the invention is therefore to overcome the disadvantages of the prior art providing an ettringite binder comprising calcium sulphate and a calcium aluminate mineral compound, allowing to reach in dense environments the best compromise between the workability hold time and the mechanical strength acquisition kinetics.

Another advantage of the invention is to allow for a reoperation of structures, while keeping a workability equivalent to that obtained with prior art mortars. For formulations containing binders with a same alumina content, a same binder degree and an identical Blaine fineness for the calcium aluminate, the acquisition of mechanical strengths is then much more quicker and the pedestrian recirculation time is twice shorter with mortars prepared with the binder according to the invention than with mortars made using a prior art binder.

DETAILED DESCRIPTION OF THE INVENTION

Figure 1:
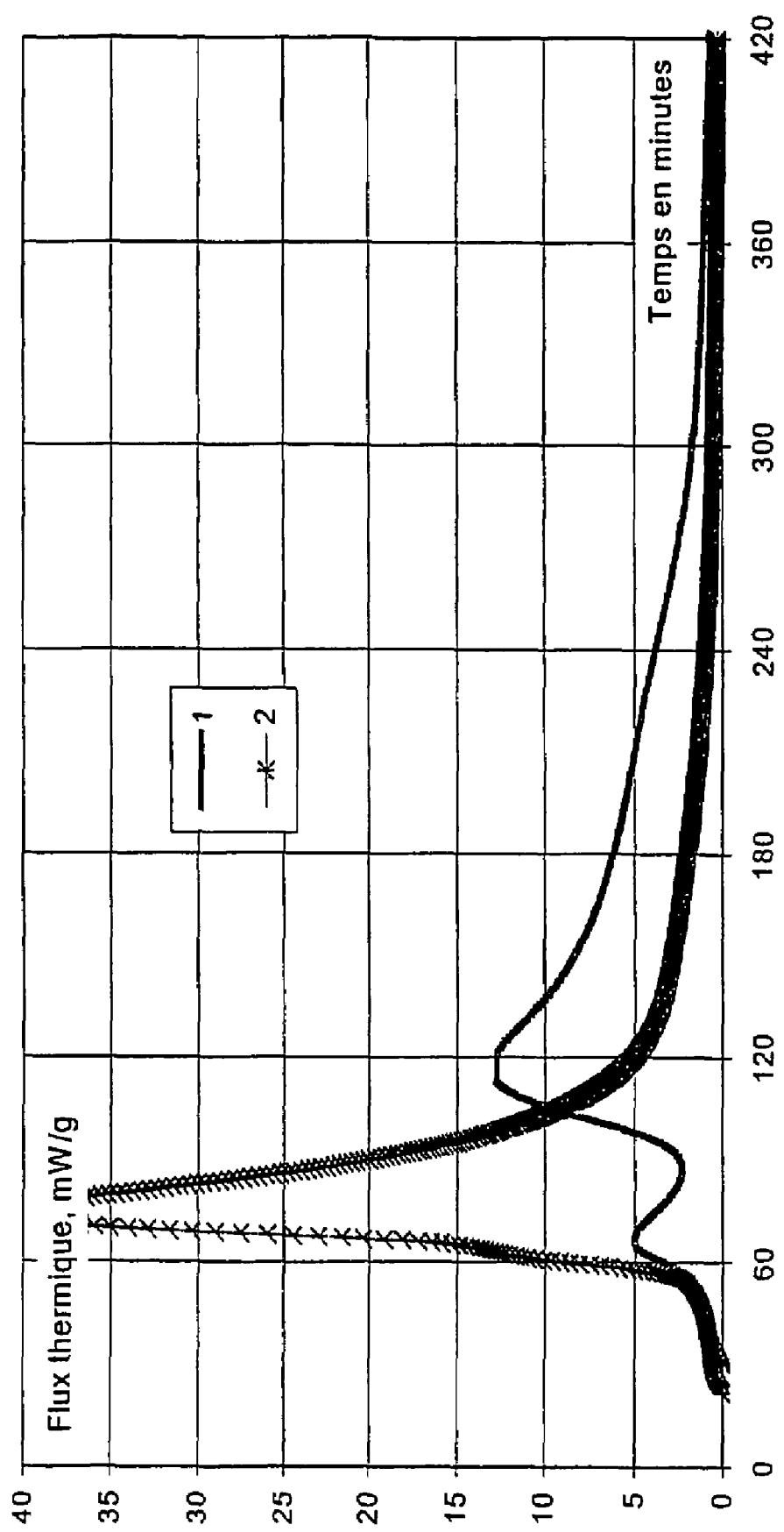
FIG. 1 shows the thermal flow curves obtained through isothermal microcalorimetry according to the invention (curve 2) compared to the prior art (curve 1)

The invention therefore aims at providing an ettringite binder for a dense mortar, said mortar preferably having when mixed with water a water/solid weight ratio lower than 0.5, said binder comprising calcium sulphates and a calcium aluminate mineral compound, the aluminates and the sulphates and the concentration thereof in the binder being such that the respectively calcium and aluminium ions are released in optimum proportions simultaneously and regularly throughout the entire hydration process, leading to the formation of ettringite without early blocking at the anhydrous grain-water interfaces, which hinders the dissolution of anhydrous grains and consequently reduces the formation yield for ettringite.

Indeed, the ettringite formation directly results from the relative dissolution rates of the soluble components that will determine the proportions between the calcium, aluminium and sulphate ions in the solution. The calcium ion concentration acts at first order on the ettringite formation kinetics; when it is high, the ettringite formation may be very quick, even flash and consequently may occur instantaneously around the anhydrous phases containing the other required ions, i.e. either sulphates or aluminates depending on the case. Such a blocking phenomenon for the reaction interfaces is particularly critical in a dense environment and when there are large deviations between the release rates of the calcium ions of the different soluble substances and/or large deviations between the release rates of the calcium, aluminium and sulphate ions. In order to obtain the desired performance for mortars, and more particularly for dense mortars, early and very quick formation of ettringite around the least soluble grains has to be avoided since such a phenomenon then prevents the normal progress of hydration and leads to a dense mortar which does not meet the specifications, more particularly as far as short term mechanical performances are concerned.

Such a blocking phenomenon for the reaction interfaces is one of the reasons, which explains that the solutions used in a dilute environment are not adaptable to dense environments: in fact, in a dilute environment, the dissolution of the various soluble phases is significantly made easier, reducing the ettringite formation probability upon contact with grains.

Similarly, the conventional ettringite binders, comprising Portland cement and/or lime, calcium sulphate and aluminous cements, do not provide the best hardening kinetics yields. Indeed, the Portland cement comprises calcium sources with very different mineral nature and solubility, such as free lime, C3S, C2S, calcium sulphates, as well as extremely soluble minor substances, such as alkaline sulphates, which modify significantly the solubilization of calcium containing phases. This does not allow for a constant calcium supply throughout the hydration process.

As far as lime is concerned, its too quick dissolution limits the solubilization of aluminate containing phases. Excess lime also has strong consequences on the dimensional variations (very high expansion) and on the morphology of the ettringite being formed, becoming more massive, hence less texturing (mechanical strengths are reduced). Its introduction degree into the mixture is therefore limited, restricting as such the ettringite production yield for a given sulphate or aluminate content, and hence the hardening and quick drying performance.

Similarly, excess of calcium sulphate relative to phases containing calcium aluminates leads to the same effects as lime, i.e. lower mechanical strengths and high dimensional variations. This can be explained partially by the fact that the solubilization of calcium sulphates releases high amounts of calcium into the aqueous phase. This is why compositions comprising calcium aluminate and calcium sulphate phases in stoichiometric proportions (the molar ratio of calcium sulphate/aluminium oxide A is 3) cannot allow for implementing dense mortars with good hardening properties and controlled dimensional variabilities.

Controlling the mortar hydration is thus first subjected to controlling the calcium supply rate relative to other ionic species, and in particular aluminium.

The invention thus relates to an ettringite binder for a dense mortar comprising calcium sulphates and a calcium aluminate mineral compound, said calcium aluminate mineral compound comprising calcium C and aluminium A oxides, being soluble and combined into one or more crystallized and/or amorphous mineralogical phases, in proportions such that:

the C/A molar ratio useful for the calcium aluminate mineral compound ranges between 1.2 and 2.7;

the sum in weight of the useful phases (C+A) accounts for at least 30% of the weight total of the mineral compound.

Preferably, the calcium aluminate/calcium sulphate mineral compound weight ratio ranges between 0.5 and 4, more preferably between 1.5 and 3.

Still preferably, the calcium sulphate/aluminium A oxide molar ratio in the ettringite binder ranges between 0.5 and 2.

According to a preferred embodiment, the useful C/A molar ratio of the calcium aluminate mineral compound ranges between 1.3 and 2.5, more preferably between 1.6 and 2.

In addition, advantageously, the calcium sulphate/aluminium oxide A molar ratio in the ettringite binder ranges between 0.6 and 1.8, more preferably between 0.8 and 1.7.

It is meant under useful oxides C and A, those oxides C and A which give an oversaturation coefficient $\beta > 1$, when they are put in solution, in a mixture with the other selected components of the mortar composition, including calcium sulphate.

It is meant under useful phase a phase releasing useful oxides C and A.

Thus, phases C2AS, ferrites, are not useful phases (they are called "inert phases"). On the contrary, C12A7, C3A, glasses, C4A3$ (where $ stands for SO3 in the cement nomenclature), CA, for example, are useful phases.

The useful C/A molar ratio of the calcium aluminate mineral compound is thus the molar ratio of all the oxides C and A of the calcium aluminate mineral compound, which are present in the useful phases. Similarly, the sum in weight of the useful phases (C+A) is the sum in weight of phases comprising oxides C and A and which are useful phases.

Calcium and aluminium ion supply in solution thus occurs throughout the reaction in the proportions as being determined by the useful C/A molar ratio of the calcium aluminate mineral compound.

In a preferred embodiment, the dense mortar comprising the ettringite binder, when being mixed with water has a water/solid weight ratio lower than 0.5.

The ettringite binder according to the invention makes it possible to obtain excellent ettringite formation yields and therefore, a good hardening kinetics without requiring, for the mortar formulation, any complementary source of calcium ions. Another advantage when omitting such a complementary calcium source, which can be either lime, or Portland cement, is that mortar compositions are obtained having more regular performance on the important criteria of the application, Portland cement having in particular a quite variable minor species content, the impact of which on the ettringite formation is decisive.

Thus, preferably, mortars comprising the ettringite binder according to the invention do not comprise either Portland cement or hydraulic lime. They can nevertheless tolerate a low percentage of hydraulic lime and/or Portland cement, within a limit of 3.5% in weight based on the total weight of dry mortar.

According to a preferred embodiment, the sum in weight of the useful phases (C+A) accounts for at least 50% in weight of the total weight of the calcium aluminate mineral compound.

The calcium aluminate mineral compound included in the binder used for formulating the mortar could be obtained through baking aluminium A oxide rich materials, including bauxites, and chalk, in an oven with a temperature higher than 1100° C. It could be obtained under the form of one or more molten or sintered clinkers able to contain crystallized phases or amorphous phases or result from a mixture of various mineral compounds comprising calcium aluminates, obtained in turn through baking or not. The oven to be used can be any oven conventionally used for manufacturing clinkers, such as reverberating furnaces, tunnel furnaces, rotary furnaces or electrical furnaces, either with induction or electric arc.

The calcium aluminate mineral compound could be under the form of a crystallized mineralogical phase selected amongst CA, C12A7, C3A, C4A3$ or under the form of an amorphous phase, or under the form of a mixture of at least one of said crystallized mineralogical phases and an amorphous phase. Preferably, the mineral compound comprises at least 30% in weight of C12A7, more preferably at least 50% in weight of C12A7, much more preferably 50% to 85% in weight of C12A7, based on the total weight of the mineral compound.

The calcium aluminate mineral compound can also comprise at least one crystallized mineralogical phase selected amongst $C2A(1-x)Fx$, C2S, C2AS, C3S and the mixtures thereof, where F and S respectively stand for $Fe_2O_3$ and $SiO_2$ according to the cement nomenclature, and where x is an integer belonging to $]0; 1]$.

The calcium aluminate mineral compound could be ground and can then have a Blaine specific area higher than or equal to 1500 $cm^2/g$, preferably ranging from 2000 to 5000 $cm^2/g$.

The appropriate calcium sulphate for the binder can be taken from anhydrites, gypsum, semi-hydrates and mixtures thereof.

The binder comprising the calcium aluminate mineral compound according to the invention allows to obtain, after the addition of granulates and additives, a dry mortar.

The dry mortar according to the invention comprises:
  a binder according to the invention: from 15% to 75% in weight based on the total weight of the dry mortar,
  chalk fillers or siliceous sands: from 25% to 85% in weight based on the total weight of the dry mortar,
  lime and/or Portland cement: from 0% to 3.5% in weight based on the total weight of the dry mortar,
  redispersible powder polymers: from 0% to 8% in weight based on the total weight of the dry mortar, and/or solid-liquid dispersion polymers from 0% to 20% in weight based on the total weight of the dry mortar,
  rheological additives and/or setting regulating additives.

Preferably, the dry mortar according to the invention comprises:
  a binder according to the invention: from 20% to 50% in weight based on the total weight of the dry mortar,
  chalk fillers or siliceous sands: from 50% to 80% in weight based on the total weight of the dry mortar,
  lime and/or Portland cement: from 0% to 0.5% in weight based on the total weight of the dry mortar,
  redispersible powder polymers: from 0% to 5% in weight based on the total weight of the dry mortar, and/or solid-liquid dispersion polymers from 0% to 15% in weight based on the total weight of the dry mortar,
  rheological additives and/or setting regulating additives.

The powdered polymers may be selected amongst vinyl acetate copolymers, vinyl and ethylene versatates, available for example from Wacker or Elotex Corporations, and polyvinyl alcohols.

The solid-liquid dispersion polymers can be selected amongst styrene-butadiene dispersions, acrylic styrenes, acrylics, vinyl acetates, and vinyl and ethylene versatate, available for example from the Rohm & Haas Corporation.

The Theological additives are conventional components of mortars having the aim of improving the initial mixed mortar rheology. Such theological additives include casein, sulfonated melamine formaldehydes, polyoxyethylenated phosphonates (POE), ethylene polyoxide polycarbonates (PCP) and mixtures thereof. Such additives are commercially available products. As an example, OPTIMA 100® and PREMIA 150® products, marketed by CHRYSO Corporation as well as MELMENT F10®, MELFLUX PP100F® marketed by SKW Corporation may be mentioned.

The rheological additives preferably account for 0.1 to 0.5% of the weight total of the dry mortar. They are often associated with hydrosoluble polymers, having the function of limiting the segregation, such as cellulose ethers, as well as welan gums and polysaccharides.

The setting regulating additives may be setting accelerators or setting retarders. They preferably account for 0.1 to 0.5% of the total weight of the dry mortar. Preferably, tartaric acid could be used, combined with sodium gluconate as a setting retarder.

The dry mortar according to the invention allows for obtaining a wet mortar through mixing with water. Preferably, the amount of water is such that the water/solid weight ratio is lower than 0.5.

Another aim of the invention is the use of a calcium aluminate mineral compound for formulating an ettringite binder according to the invention.

Still another object of the invention is the use of a calcium aluminate mineral compound for formulating a dry mortar according to the invention.

Finally another object of the invention is the use of a calcium aluminate mineral compound for formulating a wet mortar according to the invention.

The invention is illustrated and detailed by the following examples. In all such examples, the useful C/A ratio is a molar ratio; the useful (C+A) percentage is expressed in weight based on the total weight of the mineral compound; the ratio of calcium sulphate/$Al_2O_3$ is a molar ratio; the amount of mixing water is given in percentage in weight based on the total weight of the dry components of the mortar.

EXAMPLE 1

COMPARATIVE EXAMPLES 2, 3, 4, 5

A mortar is prepared according to the invention, comprising a binder according to the invention (trial no. 1). By way of comparison, mortars are prepared from binders belonging to the prior art (trials nos. 2, 3, 4, 5).

Table 1 shows the composition of the binders.

TABLE 1

| | Trial no. | | | | |
|---|---|---|---|---|---|
| | 1 | 2 | 3 | 4 | 5 |
| Calcium aluminate mineral compound (SSB = 3000 cm²/g): | | | | | |
| useful C/A | 1.77 | 55 | 1 | 1 | 1 |
| useful (C + A) (%) | 87 | CA | 55 | 55 | 55 |
| major phases | C12 | 54 | CA | CA | CA |
| amount (% in weight) | A7 | 65 | 65 | 63 | 63 |
| Calcium sulphate* (% in weight) | 35 | 36 | 35 | 33.5 | 33.5 |
| Calcium sulphate/$Al_2O_3$ (molar ratio) | 0.85 | — | — | — | — |
| Supplemental calcium ion source: | | | | | |
| nature** | — | P/C | — | C | P |
| amount (% in weight) | — | 5/5 | — | 3.5 | 3.5 |

*Calcium sulphate: semi-hydrate with 95% purity
**P = CEM I 52.5 CP2 Portland cement; C = lime Table 2 shows the composition of mortars comprising the binders from table 1.

TABLE 2

| AFNOR sand | 1350 g |
|---|---|
| Binder | 675 g |
| Sodium gluconate | 2.025 g |
| $Li_2CO_3$ | 2.025 g |
| Water | 270 g |

Table 3 shows the rheological and mechanical features of the resulting mortars.

TABLE 3

| | Trial no. | | | | |
|---|---|---|---|---|---|
| | 1 | 2 | 3 | 4 | 5 |
| DP*Vicat | 20 min | 12 min | 45 min | 45 min | 50 min |
| Rc** 3 h (MPa) | 30 | 4.0 | 5 | 2 | 8.5 |
| Rc 24 h (MPa) | 46 | 3.5 | 28 | 2 | 31.5 |
| Rc 28 days (MPa) | 60 | 11.5 | 47.5 | 15.5 | 50 |
| Comments | No comments | Cracks at 28 days | No comments | No comments | No comments |

*DP Vicat: Setting onset as measured according to the "Vicat" method
**Rc: Compression strengths, as measured on test tubes measuring 4 × 4 × 16 cm.

Such trials show that the mortars according to the invention have very good mechanical compression strengths at the short term, while having a long and adjustable enough setting time through the choice of the retarder dosage.

It can also be seen that the prior art mortars, comprising the usual aluminous cements (majority of CA phase) and a complementary supply in Portland cement and/or lime, do not allow, for equivalent setting times, to obtain satisfactory mechanical strengths in the short term (4 to 8 MPa, compared to 30 MPa for the mortar according to the invention).

Similarly, in some cases in the presence of lime, the long term strengths still have a very low level.

EXAMPLE 6

COMPARATIVE EXAMPLES 7, 8

A mortar is prepared according to the invention, with a binder according to the invention (no. 6) and two prior art mortars, for comparison, prepared with a prior art binder (nos. 7, 8).

The mortar compositions and their rheological and mechanical features are shown in table 4.

TABLE 4

| | Trial no. | | |
|---|---|---|---|
| | 6 | 7 | 8 |
| Calcium aluminate mineral compound (SSB: 3000 cm²/g): | | | |
| useful C/A | 1.77 | 1 | 1 |
| useful (C + A) (%) | 87 | 70 | 70 |
| major phases | C12A7 | CA | CA |
| amount (% in weight) | 19 | 22.5 | 19 |
| Calcium sulphate (% in weight) | 11 | 7.5 | 11 |
| Calcium sulphate/$Al_2O_3$ (molar ratio) | 0.92 | — | — |
| Slag (% in weight) | 20 | 20 | 20 |
| Siliceous sand (% in weight) | 47.25 | 47.25 | 47.25 |
| RE523Z (% in weight) | 2 | 2 | 2 |
| Lifetech 115 (% in weight) | 0.1 | 0.1 | 0.1 |
| Trisodium citrate (% in weight) | 0.1 | 0.1 | 0.1 |
| Melment F10 (% in weight) | 0.3 | 0.3 | 0.3 |
| Sodium gluconate (% in weight) | 0.05 | 0.05 | 0.05 |
| MT400PFV (% in weight) | 0.05 | 0.05 | 0.05 |
| Dehydran 1922 (% in weight) | 0.15 | 0.15 | 0.15 |
| Water | 20 | 20 | 20 |
| DP Vicat (min) | 105 | 60 | 65 |
| Rc 4 h (MPa) | 14.5 | 9.5 | 11 |
| Rc 24 h (MPa) | 25.5 | 20.5 | 21 |
| Rc 7 days (MPa) | 41 | 28.5 | 28.5 |
| Retraction at 7 days (mm/m) | −0.6 | −1.6 | −1.05 |

TABLE 4-continued

| | Trial no. | | |
|---|---|---|---|
| | 6 | 7 | 8 |
| Ettringite formed at 7 days (J/g) | 135 | 70 | 110 |
| Residual anhydrite at 7 days | 315 | 280 | 500 |

The calcium sulphate is 95% pure anhydrite.

The slag is a blast furnace slag.

The siliceous sand comes from Sifraco Corporation, and is marketed under designation Sable NE14 (Sand NE14), the grain size of which is lower than 500 μm (d50=210μm).

RE523Z is a resin marketed by Wacker Corporation. It is a vinyl acetate and ethylene copolymer.

Lifetech 115: this is lithium carbonate marketed by FMC.

Melment F10: sulfonated melamine formaldehyde marketed by SKW.

Sodium gluconate: marketed by Roquette Frères.

MT400PFV: cellulose ether marketed by Wolf Walsrode.

Dehydran 1922: antifoam marketed by Rhodia.

The residual anhydrite amount (given in an arbitrary unit) is measured by the height of the peak obtained by X-ray diffraction.

The ettringite amount being formed is measured by the evolved heat flow in DSC (Differential Scanning Calorimetry).

The retraction is measured at 7 days on 2×2×16 cm test-tubes stored at 20° C. and 50% relative humidity.

The mechanical strengths are measured on 2×2×16 cm test-tubes, stored at 20° C. and 70% hygrometry.

It can be seen that the calcium aluminate mineral compound according to the invention allows for a much better performance compromise:
- the mechanical strength acquisition kinetics is much better than with mortars formulated with prior art mineral compounds,
- the dimensional variation control is better as well,
- a better ettringite formation yield is obtained, as evidenced by the higher ettringite amount being formed and the lower residual anhydrite amount.

EXAMPLES 9, 10 AND COMPARATIVE EXAMPLE 11

Repair mortars are prepared according to the invention (trials 9 and 10) and also a prior art comparative mortar (trial 11). Their compositions are shown in table 5.

TABLE 5

| | Trial no. | | |
|---|---|---|---|
| | 9 | 10 | 11 |
| Calcium aluminate mineral compound (SSB: 3000 cm²/g): | | | |
| useful C/A | 1.77 | 1.77 | 1 |
| useful (C + A) (%) | 87 | 87 | 70 |
| major phases | C12A7 | C12A7 | CA |
| amount (% in weight) | 28 | 30 | 33 |
| Calcium sulphate (% in weight) | 15 | 13 | 10 |
| Calcium sulphate/Al₂O₃ (molar ratio) | 0.85 | 0.69 | — |
| Palvadeau siliceous sand 0–315 μm (% in weight) | 19 | 19 | 19 |
| Palvadeau siliceous sand 315 μm–1 mm (% in weight) | 19 | 19 | 19 |

TABLE 5-continued

| | Trial no. | | |
|---|---|---|---|
| | 9 | 10 | 11 |
| Palvadeau siliceous sand 1–4 mm (% in weight) | 19 | 19 | 19 |
| Sodium gluconate (% in weight) | 0.1 | 0.1 | 0.1 |
| Tartaric acid (% in weight) | — | 0.15 | — |
| Li₂CO₃ (% in weight) | 0.1 | 0.05 | 0.1 |
| TOTAL | 100 | 100 | 100 |
| Water | 17.2 | 17.2 | 17.2 |

Calcium sulphate: 95% pure semi-hydrate

The rheological and mechanical features of the mortar are shown in table 6.

TABLE 6

| | Trial no. | | |
|---|---|---|---|
| | 9 | 10 | 11 |
| DP Vicat | 15 min | 48 min | 35 min |
| FP Vicat | 22 min | 62 min | 45 min |
| Rc 4 h (MPa) | 37 | 33 | 14 |
| Rc 24 h (MPa) | 51 | 45 | 40 |
| Rc 28 days (MPa) | 61 | 52 | 55 |

FP Vicat: Vicat setting end

The mechanical strengths are measured on 4×4×16 cm test-tubes, stored at 20° C. and 70% hygrometry.

It can be seen that the mortars according to the invention have a far better strength acquisition kinetics (acquisition at 4 hours) and this is true for equivalent setting times.

EXAMPLE 12

A glue mortar is prepared according to the invention. Its composition is shown in table 7.

TABLE 7

| | Trial no. 12 |
|---|---|
| Calcium aluminate compound (SSB: 3000 cm²/g): | |
| useful C/A | 1.77 |
| useful (C + A) (%) | 87 |
| major phases | C12A7 |
| amount (% in weight) | 26.5 |
| Calcium sulphate (% in weight) | 13.5 |
| Calcium sulphate/Al₂O₃ (molar ratio) | 0.81 |
| Durcal 15 (% in weight) | 9 |
| Sifraco siliceous sand NE14 (% in weight) | 48.65 |
| RE530Z (% in weight) | 1.5 |
| Tylose MH3001P6 (% in weight) | 0.35 |
| Trisodium citrate (% in weight) | 0.2 |
| Sodium bicarbonate (% in weight) | 0.2 |
| Li₂CO₃ (% in weight) | 0.1 |
| TOTAL | 100 |
| Water | 25.5 |

Calcium sulphate: 95% pure semi-hydrate.
Durcal 15: Calcium carbonate marketed by OMYA with a grain size d50 of 15 μm, with 1% of the grains having a size higher than 100 μm.
RE530Z is a resin marketed by Wacker Corporation. It is a vinyl acetate and ethylene copolymer.
Tylose MH3001P6: cellulose ether marketed by Clariant.

The mechanical properties are shown in table 8.

TABLE 8

|  | Trial no. 12 |
| --- | --- |
| Opened time on paving | 20 min |
| DP Vicat | 45 min |
| Adhesion at 4 h (MPa) | 0.5 |
| Adhesion at 24 h (MPa) | 1.2 |
| Adhesion at 28 d (MPa) | 2.1 |

The adhesion is measured on a SATTEC dynamometer according to the operating mode as described in the Cahier des Prescriptions Techniques d'Exécution "Revêtements des sols intérieurs et extérieurs en carreaux céramiques ou analogues collés au moyen de mortiers colles" CSTB 3267 leaflet.

A product is obtained having an opened time of 20 minutes and good mechanical properties.

EXAMPLE 13

A quick fluid screed is prepared with a calcium aluminate mineral compound according to the invention and gypsum (trial 13).

The composition and the Theological and mechanical results are shown in table 9.

TABLE 9

|  | Trial no. 13 |
| --- | --- |
| Calcium aluminate compound (SSB = 2010 cm²/g): |  |
| useful C/A | 1.77 |
| useful (C + A) (%) | 87 |
| major phases | C12A7 |
| amount (% in weight) | 14.3 |
| Calcium sulphate (% in weight) | 7.2 |
| Calcium sulphate/Al₂O₃ (molar weight) | 0.80 |
| Calcium ion supplemental source: |  |
| nature | C |
| amount (% in weight) | 0.2 |
| Siliceous sand 1–4 mm (% in weight) | 49.4 |
| Siliceous sand 0–315 µm (% in weight) | 15.3 |
| E10 (% in weight) | 8.0 |
| D130 (% in weight) | 3.9 |
| RE523Z (% in weight) | 1 |
| Dehydran 1922 (% in weight) | 0.1 |
| Cellulose ether (% in weight) | 0.07 |
| Li₂CO₃ (% in weight) | 0.05 |
| Casein (% in weight) | 0.3 |

TABLE 9-continued

|  | Trial no. 13 |
| --- | --- |
| K₂SO₄ (% in weight) | 0.2 |
| Sodium gluconate (% in weight) | 0.06 |
| Tartaric acid (% in weight) | 0.12 |
| TOTAL | 100 |
| Water | 14 |
| Self spreading 7 min (mm) | 260 |
| Self spreading 20 min (mm) | 260 |
| Opened time (min) | 95 |
| DP Vicat (min) | 115 |
| FP Vicat (min) | 145 |
| Rc 5 h (MPa) | 15.8 |
| Rc 24 h (MPa) | 20.3 |

C: lime marketed by Balthazar & Cotte
Calcium sulphate: 95% pure gypsum
Siliceous sand: Palvadeau sand
E10: Sifraco siliceous sand with a grain size d50 = 21 µm
D130: Durcal 130 chalk marketed by OMYA, 76% of the grains having a size higher than 100 µm and 0.2% of the grains having a size lower than 500 µm
Casein: marketed by Unilait The self spreading is measured with an ASTM frusto-conical cone (described in the ASTM C230 standard).

The opened time corresponds to the time at the end of which the paste has lost its ability to flow by itself.

The mechanical strengths are measured on 4×4×16 cm test-tubes, stored at 20° C. and 70% hygrometry.

The screed Theological properties (spreading) are good, and even with a very long opened time (1 h 30), the hardening kinetics remains very quick, and this, despite the lack of Portland cement and a very low Blaine surface area of the calcium aluminate mineral compound according to the invention.

EXAMPLES 14, 15

COMPARATIVE EXAMPLES 16, 17, 18 and 19

Smoothing coatings are prepared with calcium aluminate and calcium sulphate mineral compounds according to the invention (trials 14, 15) which are compared with control mixtures based on calcium aluminate mineral compounds of the prior art and Portland cement (trials 16, 17, 18, 19). The compositions are shown in table 10.

In order to make it easier to compare the performance between mortars of the prior art and mortars according to the invention, table 10 shows the total amount, in weight, of alumina in the binder.

TABLE 10

|  | Invention | | Prior art | | | |
| --- | --- | --- | --- | --- | --- | --- |
|  | Trial no. | | | | | |
|  | 14 | 15 | 16 | 17 | 18 | 19 |
| Calcium aluminate compound (SSB: 2010 cm²/g): |  |  |  |  |  |  |
| useful C/A | 1.77 | 1.77 | 1 | 1 | 1 | 1 |
| useful (C + A) (%) | 87 | 87 | 55 | 70 | 55 | 70 |
| major phases | C12A7 | C12A7 | CA | CA | CA | CA |
| amount (% in weight) | 18 | 17 | 20 | 20 | 20 | 20 |
| Calcium ion supplemental source: |  |  |  |  |  |  |
| nature | — | C | P | P | P/C | P/C |
| amount (% in weight) | — | 0.4 | 4 | 4 | 6/0.2 | 6/0.2 |

TABLE 10-continued

|  | Invention | | Prior art | | | |
|---|---|---|---|---|---|---|
| | Trial no. | | | | | |
| | 14 | 15 | 16 | 17 | 18 | 19 |
| Total alumina % | 7.4 | 7 | 8 | 10.6 | 8.1 | 10.7 |
| Calcium sulphate (% in weight) | 9 | 7 | 7 | 7 | 7 | 7 |
| Calcium sulphate/$Al_2O_3$ (molar ratio) | 0.79 | 0.65 | — | — | — | — |
| Durcal 15 (% in weight) | 23 | 27 | 19 | 19 | 18 | 18 |
| Durcal 130 (% in weight) | 9 | 10 | 9 | 9 | 10 | 10 |
| NE14 (% in weight) | 37.8 | 36 | 37.8 | 37.8 | 36 | 36 |
| RE523Z (% in weight) | 2 | 2.5 | 2 | 2 | 2.5 | 2.5 |
| $Li_2CO_3$ (% in weight) | 0.05 | 0.05 | 0.1 | 0.1 | 0.05 | 0.05 |
| Citric acid (% in weight) | — | — | 0.02 | 0.02 | — | — |
| Tartaric acid (% in weight) | 0.075 | 0.1 | 0 | 0 | 0.07 | 0.07 |
| Melflux PP100F (% in weight) | 0.2 | — | 0.2 | 0.2 | — | — |
| MT400PFV cellulose ether (% in weight) | 0.06 | 0.06 | 0.05 | 0.07 | 0.06 | 0.06 |
| Dehydran 1922 (% in weight) | 0.1 | 0.1 | 0.1 | 0.1 | 0.1 | 0.1 |
| $K_2SO_4$ (% in weight) | — | 0.2 | — | — | 0.2 | 0.2 |
| Casein (% in weight) | — | 0.4 | — | — | 0.4 | 0.4 |
| Sodium gluconate (% in weight) | — | 0.06 | — | — | 0.03 | 0.03 |
| Water | 24 | 24 | 24 | 24 | 24 | 24 |

Calcium sulphate: 95% pure semi-hydrate
P: CPA CEM I 52.5 CP2 Portland cement;
C = lime
Durcal 15: chalk marketed by OMYA
Durcal 130: chalk marketed by OMYA The mechanical and rheological properties are shown in table 11.

TABLE 11

|  | Invention | | Prior art | | | |
|---|---|---|---|---|---|---|
| | Trial no. | | | | | |
| | 14 | 15 | 16 | 17 | 18 | 19 |
| Self spreading 7 min (mm) | 144 | 148 | 150 | 151 | 143 | 149 |
| Self spreading 20 min (mm) | 145 | 146 | 150 | 120 | 145 | 144 |
| Gelling time (min) | 29 | 42 | 30 | 26 | 50 | 45 |
| DP Vicat (min) | 35 | 55 | 80 | 35 | 120 | 95 |
| FP Vicat (min) | 40 | 65 | 90 | 40 | 140 | 120 |
| Reoperation[1] | 1 h 30 | 1 h 30 | 3 h | 2 h 30 | 3 h | 3 h |
| Rc 2 h (MPa) | 5 | 10 | 1.5 | 3 | 1 | 0.5 |
| Rc 4 h (MPa) | 17.5 | 12.5 | 4 | 7.5 | 6.5 | 6.5 |
| Rc 24 h (MPa) | 24.5 | 18 | 18 | 24 | 15.5 | 17.5 |
| Rc 28 d (MPa) | 38 | 29 | 28 | 35 | 28.5 | 29 |
| Coating time[2] | 12 h | 12 h | 24 h | 24 h | 24 h | 24 h |
| Ettringite 4 h[3] | — | 140 | — | — | 100 | 110 |
| Ettringite 24 h[4] | — | 160 | — | — | 140 | 150 |
| Adhesion[5] | — | 2.8 | — | — | 2.3 | — |
| Retraction[6] | — | 0.8 | — | — | 1 | — |

[1] Reoperation: Time at the end of which the mechanical compression strength of the smoothing coating reaches 3 MPa.
[2] Coating time: Time at the end of which the smoothing coating has a residual humidity (measured according to the calcium carbide method (acetylene evolvement upon contact with the material humidity) using the CM Tester from Riedel & Haën) lower than 3%, measured in a 9 mm thickness on a concrete paving at 23° C. and 50% hygrometry.
[3] Ettringite 4 h: Amount of Mixing water crystallized under the form of ettringite in g/kg of formulated product, at t = 4 h00, measured according to the calcium carbide method (acetylene evolvement upon contact with the material humidity) using the CM Tester from Riedel & Haën.
[4] Ettringite 24 h: Mixing water amount crystallized under the form of ettringite in g/kg of formulated product, at t = 24 h00.
[5] Adhesion: Measured with a Sattec dynamometer according to the operating protocol described in the technical guide for the technical advice and classification P. CSTB leaflets, no. 2893, on a concrete support at 28 days, with no hanging primer, in Mpa.
[6] Retraction: Drying retraction, measured at 28 days on 2 × 2 × 16 cm test-tubes, stored at 20° C. - 70% relative humidity, in mm/m.

The gelling time and the self spreading are measured according to the operating protocol as described in the technical guide for the technical advice and classification P. CSTB leaflets, no. 2893.

The mechanical strengths are measured on 2×2×16 cm test-tubes, stored at 20° C. and 70% hygrometry.

FIG. 1 shows the thermal flow curves for trial 15 (curve 2) according to the invention and trial 18 (curve 1) according to the prior art, obtained through isothermal microcalorimetry. The ettringite amount formed at the short term is visualized through the heat flow evolved by the reaction.

The rheological (spreading) properties are good with smoothing coatings of the invention and those from the prior art, but the mechanical properties (compression strength) are far more improved with the binder according to the invention.

As shown on FIG. 1, the ettringite is formed, in the mortar formulated with the binder of the invention, in a much shorter time than with the mortar formulated with the prior art binder and in one single step, as opposed to the mortar formulated with the prior art binder.

In addition, the calcium aluminate mineral compound according to the invention allows for a reoperation twice as quick, without any complementary supply in Portland cement in the binder and with a lower total alumina content in the composition.

Finally, the future performance, either drying retraction or compression strength or adhesion to the support, has a higher level too.

EXAMPLES 20, 21 AND 22

Three clinkers (A, B and C) are manufactured according to the invention, having a different mineralogy.

Clinkers A and B are manufactured through melting from bauxite and chalk in a refractory crucible at a temperature of 1400° C. Clinker C is manufactured through sintering from bauxite, chalk and anhydrite in a refractory crucible at a temperature of 1300° C. for 2 hours.

The mineral compositions (expressed in percentage in weight based on the total weight of the clinker) of such clinkers are given in table 12 hereinbelow:

TABLE 12

|  |  | A | B | C |
|---|---|---|---|---|
| Useful phases | CA | 5 |  |  |
|  | C12A7 | 45 | 65 | 45 |
|  | C3A |  | 5 |  |
|  | C4A3$ |  |  | 40 |
| Inert phases |  | 50 | 30 | 15 |
| SSB |  | 3010 | 2000 | 2900 |
| Useful C/A |  | 1.61 | 1.8 | 1.53 |
| Useful C + A |  | 50% | 70% | 85% |

The composition of the mortar obtained from such clinkers and their mechanical and rheological features are shown in table 13.

TABLE 13

|  | Trial no. | | |
|---|---|---|---|
|  | 20 | 21 | 22 |
| Calcium aluminate compound (% in weight) | 20 | 20 | 20 |
| Calcium sulphate (% in weight) | 9 | 9 | 7 |
| Calcium sulphate/Al$_2$O$_3$ (molar ratio) | 1.21 | 0.91 | 0.73 |
| Durcal 15 (% in weight) | 22 | 22 | 24 |
| Durcal 130 (% in weight) | 8 | 8 | 8 |
| NE14 (% in weight) | 38.6 | 38.6 | 38.6 |
| RE523Z (% in weight) | 2 | 2 | 2 |
| Li$_2$CO$_3$ (% in weight) | 0.05 | 0.05 | 0.05 |
| Tartaric acid (% in weight) | 0.06 | 0.04 | 0.05 |
| Melflux PP100F (% in weight) | 0.15 | 0.1 | 0.15 |
| MT400PFV cellulose ether (% in weight) | 0.06 | 0.06 | 0.06 |
| Dehydran 1922 (% in weight) | 0.08 | 0.08 | 0.08 |
| Water | 24% | 24% | 24% |
| Self spreading 7 min (mm) | 150 | 148 | 148 |
| Self spreading 20 min (mm) | 138 | 144 | 140 |
| Gelling time (min) | 23 | 30 | 35 |
| DP Vicat (min) | 32 | 40 | 42 |
| FP Vicat (min) | 35 | 55 | 52 |
| Rc 2 h (MPa) | 3.5 | 5 | 3 |
| Rc 4 h (MPa) | 4.5 | 7 | 10.5 |
| Rc 24 h (MPa) | 17 | 17.5 | 20.5 |
| Rc 28 d (MPa) | 26.5 | 22.5 | 30.5 |

Calcium sulphate: 95% pure semi-hydrate

The mechanical strengths are measured on 2×2×10 cm test-tubes, stored at 20° C. and 70% hygrometry.

The binders according to the invention allow for mortars to be obtained with good behaviour compromises, both on the rheological and the mechanical level.

The invention claimed is:

1. An ettringite binder for dense mortar comprising calcium sulphates and a calcium aluminate mineral compound, characterized in that the calcium aluminate mineral compound comprises calcium C and aluminium A oxides, soluble and combined into one or more crystallized and/or amorphous mineralogical phases, in proportions such that:
   i) a C/A molar ratio of the calcium aluminate mineral compound ranges from 1.2 to 2.7,
   ii) a sum in weight of the (C+A) phases accounts for at least 30% of the total weight of the mineral compound, and
   iii) a calcium sulphate/aluminium A oxide molar ratio in the ettringite binder ranges from 0.5 to 2.

2. The ettringite binder for dense mortar according to claim 1, characterized in that the calcium aluminate mineral compound /calcium sulphate weight ratio ranges from 0.5 to 4.

3. The ettringite binder for dense mortar according to claim 1, characterized in that the C/A molar ratio of the calcium aluminate mineral compound ranges from 1.3 to 2.5.

4. The ettringite binder for dense mortar according to claim 1, characterized in that the calcium sulphate/aluminium A oxide molar ratio in the ettringite binder ranges from 0.6 to 1.8.

5. The ettringite binder for dense mortar according to claim 1, characterized in that a mortar comprising the ettringite binder has, when mixed with water, a water/solids weight ratio lower than 0.5.

6. The ettringite binder for dense mortar according to claim 1, characterized in that the mortar comprises lower than 3.5% in weight Portland cement and/or hydraulic lime based on the total weight of dry mortar.

7. The ettringite binder for dense mortar according to claim 1, characterized in that the sum in weight of the useful (C+A) phases accounts for at least 50% in weight of the total weight of the calcium aluminate mineral compound.

8. The ettringite binder for dense mortar according claim 1, characterized in that the calcium aluminate mineral compound is obtained through baking in an oven at a temperature higher than 1100° C., in a form of one or more molten or sintered clinkers able to contain crystallized phases or amorphous phases.

9. The ettringite binder for dense mortar according to claim 1, characterized in that the calcium aluminate mineral compound is in a form selected from the group consisting of a crystallized mineralogical phase CA, a crystallized mineralogical phase C12A7, a crystallized mineralogical phase C3A, a crystallized mineralogical phase C4A3SO3, an amorphous phase, and a mixture of at least one of said crystallized mineralogical phases and one amorphous phase.

10. The ettringite binder for dense mortar according to claim 9, characterized in that the calcium aluminate mineral compound comprises at least 30% in weight of C12A7.

11. The ettringite binder for dense mortar according to claim 1, characterized in that the calcium aluminate mineral compound comprises at least one crystallized mineralogical phase selected from the group consisting of G2A (1−x) Fx, C2S, C2AS, C3S and mixtures thereof, where x is an integer belonging to.

12. The ettringite binder for dense mortar according to claim 1, characterized in that the calcium aluminate mineral compound is ground and has a Blaine surface area higher than or equal to 1500 cm$^2$/g.

13. The ettringite binder for dense mortar according to claim 12, characterized in that the calcium aluminate mineral compound is ground and has a Blaine surface area ranging from 2000 cm$^2$/g to 5000 cm$^2$/g.

14. The ettringite binder for dense mortar according to claim 1, characterized in that the calcium sulphate is derived from a compound selected from the group consisting of anhydrites, semi-hydrates, gypsum and mixtures thereof.

15. A dry mortar comprising:
   an ettringite binder as defined in claim 1 from 15% to 75% in weight based on the total weight of dry mortar;
   chalk fillers or siliceous sands from 25% to 85% in weight based on the total weight of dry mortar;
   lime and/or Portland cement from 0% to 3.5% in weight based on the total weight of dry mortar;
   redispersible powder polymers from 0% to 8% in weight based on the total weight of dry mortar, and/or solid-liquid dispersion polymers from 0% to 20% in weight based on the total weight of dry mortar; and
   rheological additives and/or setting regulating additives.

16. The dry mortar according to claim 15, characterized in that
- the ettringite binder is from 20% to 50% in weight based on the total weight of dry mortar,
- the chalk fillers or siliceous sands are from 50% to 80% in weight based on the total weight of dry mortar,
- the lime and/or Portland cement is from 0% to 0.5% in weight based on the total weight of dry mortar, and
- the redispersible powder polymers are from 0% to 5% in weight based on the weight total of dry mortar, and/or solid-liquid dispersion polymers are from 0% to 15% in weight based on the total weight of dry mortar.

17. The dry mortar according to claim 15, characterized in that the rheological additives account for from 0.1% to 0.5% of the total weight of dry mortar, and the setting regulating additives account for 0.1% to 0.5% of the total weight of dry mortar.

18. A wet mortar comprising:
the mortar defined in claim 15; and
water in such an amount that the water/solids weight ratio is lower than 0.5.

* * * * *